United States Patent [19]
Janssen

[11] Patent Number: 5,744,230
[45] Date of Patent: Apr. 28, 1998

[54] MICROBIAL ACOUSTICAL TILES

[76] Inventor: Felix G. Janssen, 20 Minnetonka Rd., Sea Ranch Lakes, Fla. 33308

[21] Appl. No.: 275,647

[22] Filed: Jul. 15, 1994

Related U.S. Application Data

[63] Continuation of Ser. No. 600,587, Oct. 16, 1990, abandoned.

[51] Int. Cl.$^6$ .................................................. B32B 3/26
[52] U.S. Cl. ............................ 428/305.5; 428/304.4; 428/317.9; 428/907; 428/313.7; 428/318.4
[58] Field of Search ........................ 428/304.4, 317.9, 428/907, 305.5, 313.7, 318.4

[56] References Cited

U.S. PATENT DOCUMENTS

| | | | |
|---|---|---|---|
| 3,079,213 | 2/1963 | Mendelsohn et al. | 428/907 |
| 3,978,264 | 8/1976 | Tarbell et al. | 428/318.4 |
| 3,998,944 | 12/1976 | Long | 428/907 |
| 4,324,834 | 4/1982 | Page et al. | 428/313.7 |
| 4,432,798 | 2/1984 | Helferich et al. | |
| 4,504,602 | 3/1985 | O'Connell et al. | 521/78 |
| 4,613,627 | 9/1986 | Sherman et al. | 521/68 |
| 4,682,992 | 7/1987 | Fuchs | 428/907 |
| 4,808,466 | 2/1989 | Kotani et al. | 428/907 |
| 4,978,642 | 12/1990 | Barrall | 501/84 |

OTHER PUBLICATIONS

New Riverside University Dictionary, The Riverside Publishing Comp. 1984, Boston, MA. p. 174 & p. 749.

*Primary Examiner*—Kathleen Choi
*Attorney, Agent, or Firm*—Malin, Haley, DiMaggio & Crosby, PA

[57] ABSTRACT

Acoustical tiles having incorporated therein microbicidal amounts of a microbicide are effective in inhibiting growth of micro-organisms (including viruses) in the tile pores and preventing spread of disease, cross-infections, and food contamination in facilities employing acoustical tiles.

10 Claims, 1 Drawing Sheet

5,744,230

MICROBIAL ACOUSTICAL TILES

This application is a continuation, of application Ser. No. 07/600,587, filed Oct. 16, 1990, now abandoned.

BACKGROUND OF THE INVENTION

1. Field of the Invention

The invention relates to microbicidal porous tiles of the type commonly referred to as "acoustical tiles". In particular, the invention relates to acoustical tiles having incorporated therein a fungicide, bactericide, anti-viral agent, or other microbicidal agent to inhibit the growth of micro-organisms or viruses on the surface of the tiles, and most particularly within the pores of the tiles.

Acoustical tiles are used in many applications, most usually as ceiling materials. In applications where the environment is conducive to the growth of micro-organisms (herein including viruses), the pores of the tiles become a good breeding ground for such micro-organisms, and cannot be effectively cleaned. This is particularly dangerous in sensitive environments which are desirably highly sterile, especially medical facilities such as hospitals, nursing homes and clinics, as well as laboratories, food processing facilities, kitchens, and food storage areas. While flat surfaces in these facilities are readily sterilized by wiping with appropriate sterilizing agents, acoustical tiles cannot be cleaned in this fashion, owing to their porous structure and irregular surfaces; further, the presence of micro-organisms is difficult to detect. As a result, the tiles become a source of infection; several outbreaks of disease including cross-infections attributed to growth of micro-organisms in acoustical tiles have been reported in the literature, and deaths have occurred, most notably in hospital recovery rooms.

It is accordingly desirable to provide an acoustical tile which inhibits growth of micro-organisms.

2. Discussion of Related Art

The use of microbicidal building materials is known in the art; however, these materials, such as gypsum wall-board, rockwool, fiberglass fibers and their binders, as well as roofing tiles, are characterized by flat, smooth surfaces, and are typically rendered resistant to micro-organism growth by a surface coating of an appropriate bacteriostat or other microbicide, as described, for example, in U.S. Pat. No. 3,527,596. Such a treatment is ineffective for inhibiting micro-organism growth on acoustical tiles, as a surface application of microbicide does not effectively penetrate into the tortuous porous structures. Additionally, it is known to incorporate microbicides into flat-surfaced building materials, as discussed, for example, in U.S. Pat. Nos. 3,079,213; 3,998,944; and 3,494,727. Again, however, these applications do not present the problem of effective distribution of microbicide on the interior surface of tortuous pores, without excessive, and possibly toxic, tile concentrations of microbicide.

SUMMARY OF THE DISCLOSURE

Figure 1:
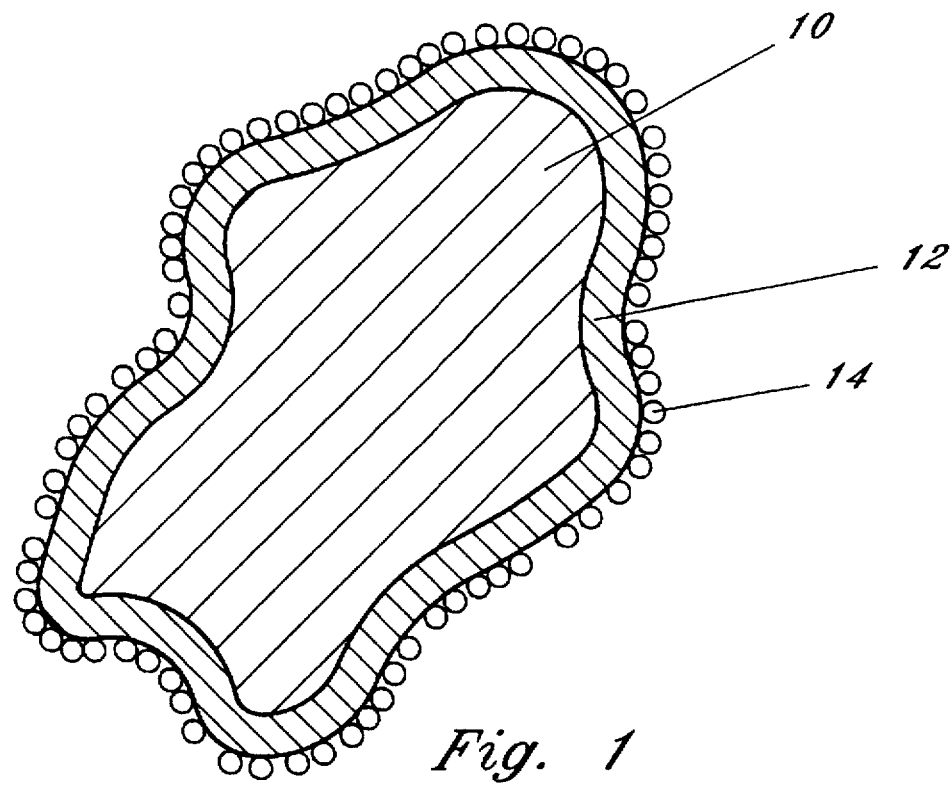
FIG. 1 illustrates in cross section a perlite particle 10 surrounded by a binder 12 of sodium silicate and alumina silicate and microbicidal particles 14.
Figure 2:
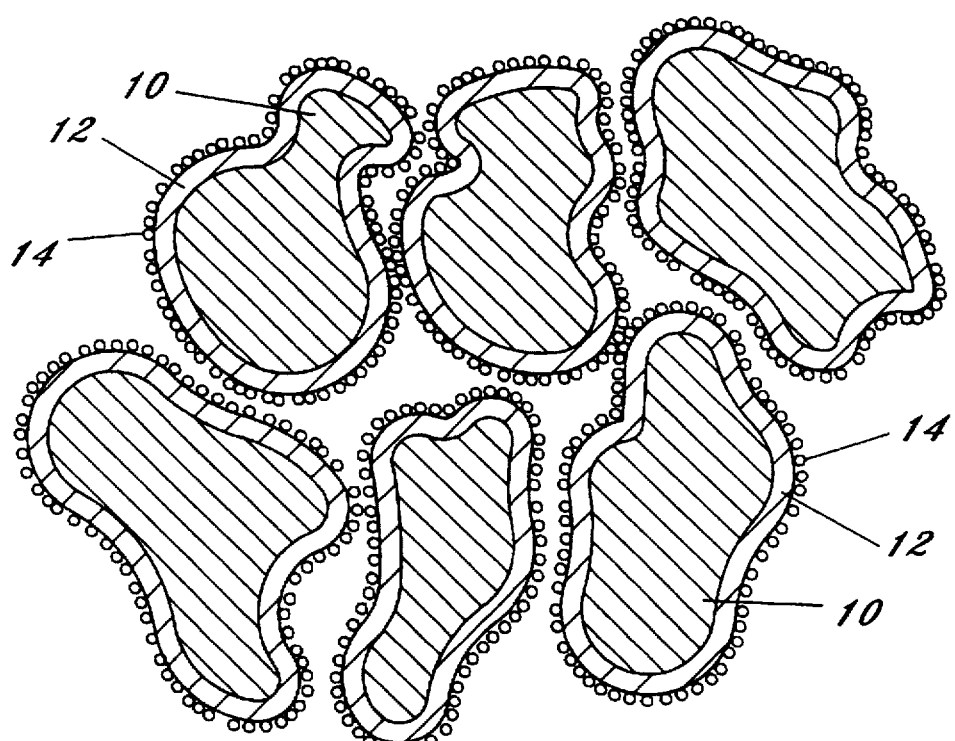
FIG. 2 illustrates in cross section an acoustical tile composition according to the invention, wherein microbicidal particles 14 are embedded in a perlite-based composition 10 bound with sodium silicate and an alumina silicate binder 12.

The invention comprises a microbicidal acoustical tile, and a method for the preparation of microbicidal acoustical tiles having an effective interior pore surface content of microbicide.

DETAILED DESCRIPTION OF THE INVENTION

The microbicidal acoustical tiles of the invention comprise any conventional acoustical tile, preferably a fire-rated acoustical tile, i.e., one that meets local building code requirements for fire-retardancy, especially for use in schools, hospitals, and other large commercial installations such as office complexes. These installations require that acoustical tiles used in construction be fire-rated along guidelines laid down by the American Society for Testing Materials (ASTM, Philadelphia, Pa.) to suit their intended use, usually Class A or zero smoke, zero flame spread indicating the fire hazard rating, typically a 1 to 2 hour fire rating. Microbicidal treatment according to the invention is especially suited to such tiles. Particularly suitable acoustical tiles for incorporation of microbicide are those based on conventional acoustical tile materials, for example, rockwool, fiberglass, or mineral particles such as clay, perlite or vermiculite bound with a conventional binder such as a water-repellent adhesive, a synthetic resin such as a silicone or epoxy resin, sodium silicate, or a natural resin or polymer such as lignin or corn starch; the binder is preferably fire-resistant. Water-soluble or water-suspensible binders such as sodium silicate are typically incorporated as an aqueous solution or suspension thereof, in known manner. Other conventional additives may be included in the composition such as fire-retardants, deodorizers, or color pigments such as iron oxide, copper oxide, or lithium oxide. In general, the base material will comprise from about 80 to 90% by volume of the composition, and the binder from about 5 to 20%, depending on the volume percentage of any additives present. The primary requirement is that the product acoustical tiles have a porosity adequate for its acoustical function as known in the art; in general, suitable tile porosity is determined by the acoustical characteristics required or desired, while simultaneously keeping the tile strong enough for shipping and installation. Exemplary acoustical tile compositions are disclosed for example in DE 1,671,131 to Janssen, 4 Nov., 1971, incorporated herein by reference. A preferred acoustical tile composition according to the invention comprises particles of perlite coated with a suitable clay such as alumina silica and bound with sodium silicate, in amounts of from about 80 to 90% by volume perlite, from about 5 to 15% by volume sodium silicate, and from about 3 to 6% by volume alumina silica; most preferably, in amounts of about 85% by volume perlite, about 10% sodium silicate, and from about 4 to 5% by volume alumina silica or other suitable clay, as exemplified for example by the acoustical tiles marketed by Global Perlite Products, S.A., Belgium.

The microbicidal material to be incorporated in the acoustical tile composition comprises any known microbicide, preferably in particulate form. Exemplary microbicides for incorporation include particles of metals having microbicidal properties such as zinc, copper, cadmium, or silver; or oxides, sulfides, or salts thereof, especially zinc, zinc oxide, or zinc sulfide. Particle sizes of from about 1 to 50 microns, particularly from about 5 to 20 microns, depending on the particular base tile composition and the microbicide selected are broadly suitable in the acoustical tile composition of the invention.

The microbicidal acoustical tiles are produced by mixing together the base material, binder, and any additives desired to obtain a substantially uniform mixture; as noted above, binders such as sodium silicate are usually added as aqueous solutions or suspensions thereof. The tiles are then molded and dried in a conventional manner, usually as square foot tiles of about 1 inch thickness. Standard mixing equipment such as double-cone mixers is conveniently employed.

The microbicidal particles are conveniently incorporated at any stage of this mixing process, for example, as a pre-mix before or during the mixing of the base tile composition ingredients, or, particularly suitably as an after-mix, i.e., after the base tile composition ingredients are mixed. Depending upon the mixing equipment, the volume of material, and other factors, this may take, for example about 12 minutes for a standard batch. While both in the pre-mix and after-mix methods, a good distribution of microbicidal particles are obtained, in the after-mix method, more particles have been found to be retained on the surface of the binder and exposed in the tile pores, which is particularly advantageous for tile biocidal activity. Alternately, solubilized microbicide, such as zinc oxide in or other microbicidal particles such as those noted above which are soluble or solubilizable in aqueous solution with solubilizing aids to provide a sprayable solution or suspension can be sprayed onto the surfaces and into the pores of the molded tiles prior to or after drying the tiles. Particulate microbicide material is preferably incorporated at the rate of from about ¼ to 4 oz. per square foot of molded tile; depending upon factors such as the base tile material used, the microbicide, and the thickness or porosity of the tile, more or less microbicide may be used. For molded tiles (1'×1') having an average thickness of about 22.5 mm and a perlite base as set forth in the following examples, from about ¼ to 4 oz. particulate zinc oxide, preferably about 1 oz. of zinc oxide, gives an effective biocidal effect throughout the tile. In general, from about ¼ to 4 oz. of effective microbicide, usually from about ½ to 2 oz., per square foot of formed tile solids (formed base acoustical tile material having a thickness of from about 15 mm to about 26 mm), will be suitable for use according to the present invention, whether the microbicide is in particulate or liquid form. Typically, the larger the particles, the less the amount of microbicide and binder used.

In spraying, it is important to use as little as possible of the liquid composition. If too little of the microbicide is used, the anti-microbial or anti-viral action tends to be ineffective. If, on the other hand, too much microbicide is used, the tiles have a tendency to become too heavy, with the possibility of adversely affecting tile porosity and acoustical values.

EXAMPLES

Materials and Methods

The following base tile composition was used in each of the following Examples:

| Ingredient | Volume percent |
| --- | --- |
| Perlite: | 84% (approx.) (Manville Corp.), (Grade Pa 310) |
| Sodium silicate: | 10% (approx.) (about 37.5% solids, about 40 to 41.5 Baume). (Thamond Alkali Corp.) |
| Alumina silica: | 4–5% (approx.) (commercial grade) |

The base tile composition was combined as described in the following Examples with commercial grade pure particulate zinc oxide (Rexinal, N.Y., Zolder, Belgium) as microbicide having a particle size between about 5 to 20 microns.

A double-cone mixer (Oblicone, Baker-Perkins Chemical Machinery, Ltd., Stoke-on-Trent, England) which tumbles the ingredients was used for mixing.

Example I: Premix

In this method, perlite (14 oz.) was substantially uniformly mixed with from 2 to 5 ozs. alumina silica and 1 oz. of particles of ZnO for about 10 minutes in the double-cone mixer, followed by addition of the liquid sodium silicate binder (19 oz., 37-½ oz. solids) with thorough mixing for about 2 additional minutes. After the ingredients were mixed as described, the tiles were pressed and cured to a square of 1 ft. per side, of an average thickness of about 22.5 mm (⅞"). A good proportion of ZnO protruded from the binder, with an excellent antimicrobial effect on the surface of the tiles and in the pores thereof. Example II: Premix The above Example was repeated, proportionately varying the volume of the ingredients to produce tiles of different thicknesses. The tiles were studied microscopically, with the results schematically represented in the drawing (600× magnification). Similar results were obtained in each run.

Example III: Aftermix.

The procedure of Example I was followed, with the exception that the perlite, alumina silicate, and binder were first substantially uniformly mixed, the ZnO particles were then added, and aftermixed for about 3 to 4 minutes to give a substantially uniform mix. Similar results were obtained, but substantially improved microbicidal effects were observed, attributed to the fact that substantially more ZnO particles extended from the binder layer.

Example IV: Aftermix.

The procedure of Example III was followed, with the exception that the volume of the ingredients was again proportionately varied. Similar results were obtained.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. A porous acoustical tile having an outer surface and an interior body including pores, said porous acoustical tile of sufficient strength for installation containing an amount of a microbicide sufficient to inhibit growth of a micro-organism or virus on the outer surface and the interior body pores thereof, the tile being composed of granular base material and 5 to 20% (by volume of the tile composition) binder material, the grains of base material being coated with a layer of the binder material, the coated grains defining said interior body pores and said microbicide being incorporated within said layer of binder material and exposed at said interior body pores and outer tile surface.

2. A tile according to claim 1 wherein said microbicide is a particulate which protrudes from the binder layer within the pores of the tile.

3. A tile according to claim 2 wherein the size of the particulate is from 5 to 20 μm.

4. A tile according to claim 2 wherein the major proportion of the particulate microbicide is disposed on said pore surfaces and outer surfaces.

5. A tile according to claim 2 wherein the tile has a thickness in the range 15 mm to 26 mm and contain ¼ to 4 oz/ft$^2$ of particulate microbicide.

6. A tile according to claim 2 wherein the microbicide is zinc, copper, cadmium, or silver, or a microbicidal oxide, sulphide or salt thereof.

7. A tile according to claim 5 wherein the microbicide is zinc, zinc oxide, or zinc sulphide.

8. A tile according to claim 2 wherein said base material comprises perlite.

9. A tile according to claim 8 wherein said binder comprises sodium silicate.

10. A tile according to claim 1 wherein the tile composition comprises 80 to 90% by volume perlite, 5 to 15% by volume sodium silicate and 3–6% by volume alumina silica.

* * * * *